(12) United States Patent
Ehret et al.

(10) Patent No.: US 7,878,943 B2
(45) Date of Patent: Feb. 1, 2011

(54) DRIVE TRAIN OF A MOTOR VEHICLE

(75) Inventors: Fritz Ehret, Waiblingen (DE); Detlef Schnitzer, Denkendorf (DE)

(73) Assignee: Daimler AG, Stuttgart (DE)

( * ) Notice: Subject to any disclaimer, the term of this patent is extended or adjusted under 35 U.S.C. 154(b) by 841 days.

(21) Appl. No.: 11/661,170

(22) PCT Filed: Aug. 24, 2005

(86) PCT No.: PCT/EP2005/009110

§ 371 (c)(1),
(2), (4) Date: Aug. 13, 2007

(87) PCT Pub. No.: WO2006/021428

PCT Pub. Date: Mar. 2, 2006

(65) Prior Publication Data

US 2008/0009392 A1    Jan. 10, 2008

(30) Foreign Application Priority Data

Aug. 26, 2004    (DE) .................. 10 2004 041 264

(51) Int. Cl.
*B60W 10/04* (2006.01)
(52) U.S. Cl. .................... 477/111; 477/901
(58) Field of Classification Search ............. None
See application file for complete search history.

(56) References Cited

U.S. PATENT DOCUMENTS

| 3,713,351 | A | * | 1/1973 | Sakakibara et al. ........... 477/61 |
| 5,638,790 | A | * | 6/1997 | Minowa et al. ............. 123/436 |
| 5,876,302 | A | | 3/1999 | Palmeri et al. |

FOREIGN PATENT DOCUMENTS

| DE | 198 38 970 A1 | 3/2000 |
| DE | 101 29 149 A1 | 1/2002 |
| DE | 101 46 333 A1 | 5/2002 |

OTHER PUBLICATIONS

International Search Report PCT/EP2005/009110, Nov. 30, 2005.

* cited by examiner

*Primary Examiner*—David D Le
*Assistant Examiner*—Erin D Bishop
(74) *Attorney, Agent, or Firm*—Collard & Roe, P.C.

(57) ABSTRACT

The invention is based on a drive train (10) of a motor vehicle in which a control device (16) limits an output torque of a drive machine (14) to a first maximum value or a second, higher maximum value. The object of the invention is to propose a drive train which permits low fuel consumption. According to the invention, the control device (16) has a signal transmitting connection to a roadway information device (camera 53) which supplies information relating to a profile of the roadway in front of the motor vehicle. The control device (16) can thus predictively change from the first maximum value to the second maximum value or carry out shifting back in the transmission (19).

8 Claims, 2 Drawing Sheets

Figure 1:
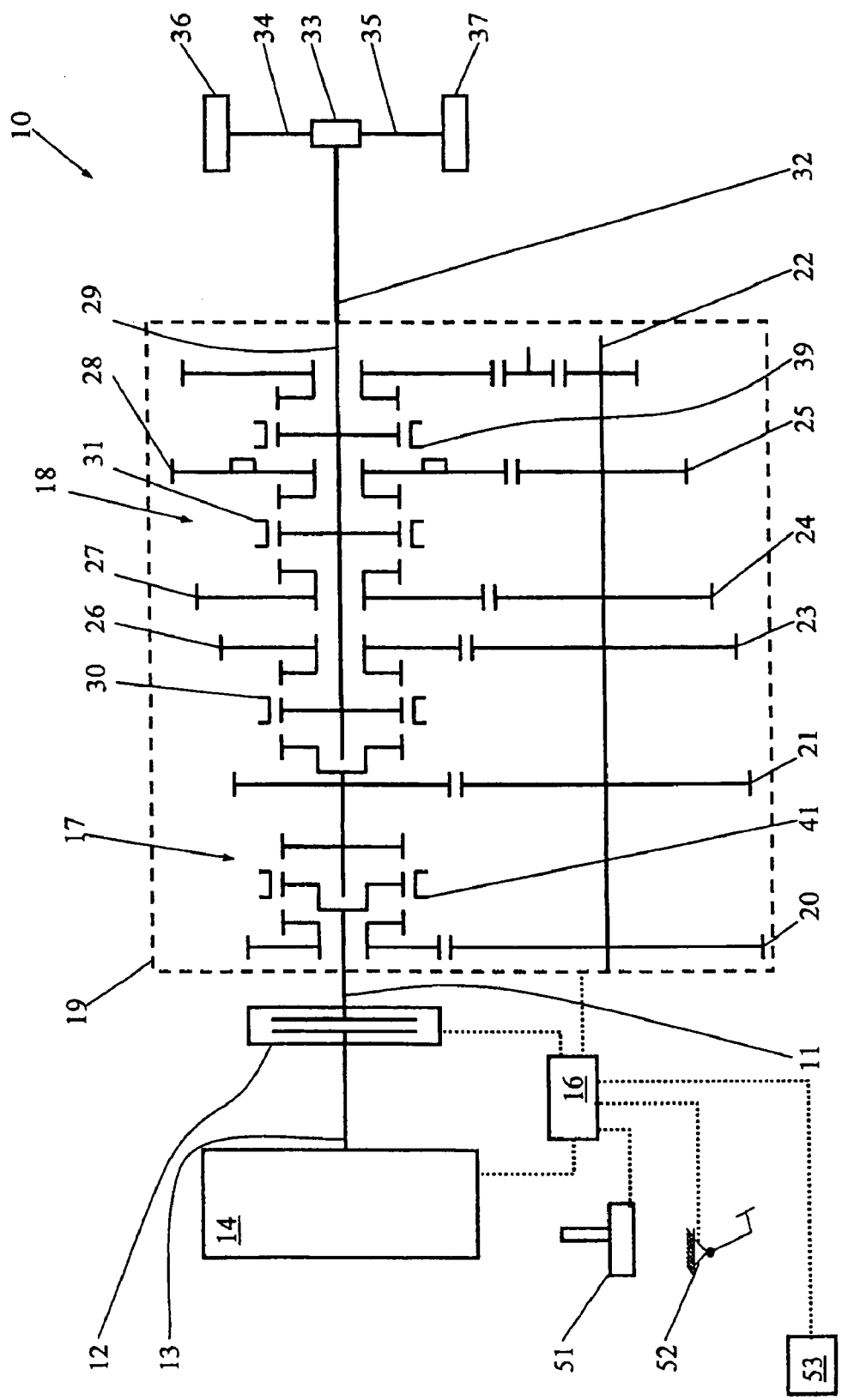

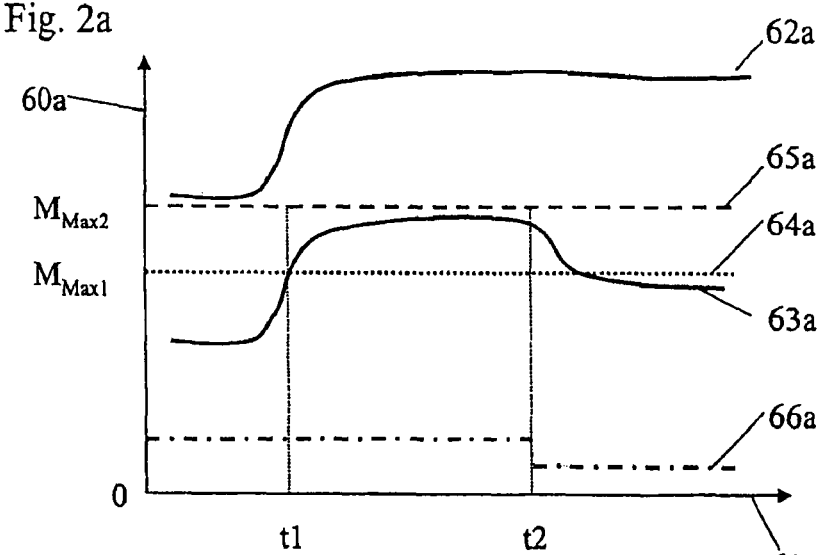
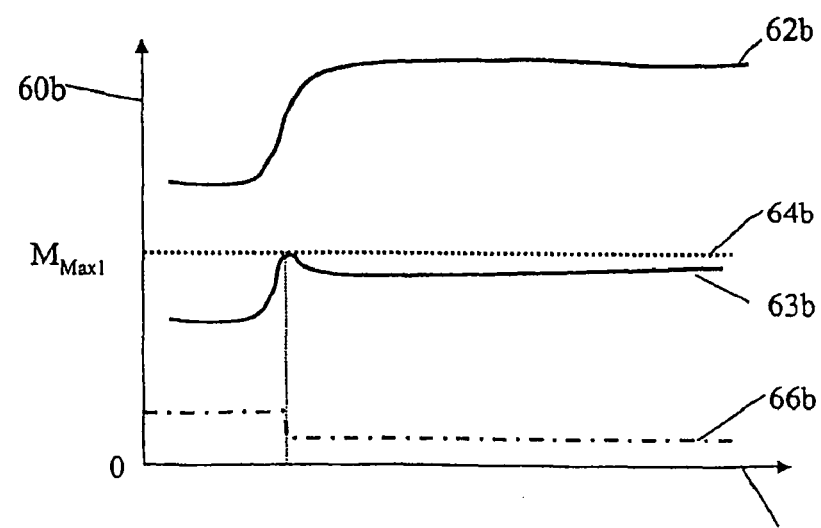
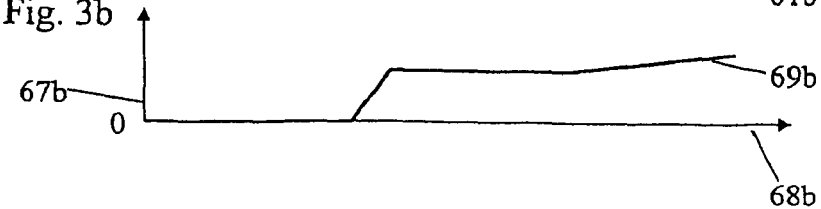

DRIVE TRAIN OF A MOTOR VEHICLE

CROSS REFERENCE TO RELATED APPLICATIONS

Applicants claim priority under 35 U.S.C. §119 of German Application No. 10 2004 041 264.2 filed Aug. 26, 2004. Applicants also claim priority under 35 U.S.C. §365 of PCT/EP2005/009110 filed Aug. 24, 2005. The international application under PCT article 21(2) was not published in English.

The invention relates to a drive train of a motor vehicle according to the preamble of patent claim 1.

U.S. Pat. No. 5,876,302 A describes a drive train of a motor vehicle having a drive machine in the form of an internal combustion engine, a transmission and a control device for actuating the drive machine. The control device limits the output torque of the drive machine to a first maximum value or a second, higher maximum value in order to protect the transmission. The limitation to the second maximum value is carried out if a direct gear speed is engaged in the transmission, and the torque is therefore transmitted from a transmission input to a transmission output without the intermediate connection of a countershaft. Unnecessary shifting back in the transmission can thus be prevented.

In vehicles with transmissions which can shift only with an interruption of the tractive force, shifting leads to a loss of speed which has to be compensated for again after the shifting process by increased power from the drive machine. Preventing unnecessary shifting back thus contributes to low fuel consumption.

However, it is possible that just after the output torque of the drive machine has increased the torque is still nevertheless insufficient to overcome the locomotive resistance of the motor vehicle so that shifting back then becomes necessary. The increase in the torque can then lead to an increase in fuel instead of a saving in fuel.

In contrast with the above, the object of the invention is to propose a drive train for a motor vehicle which permits low fuel consumption of the motor vehicle. The object is achieved according to the invention by means of a drive train having the features of patent claim 1.

The control device of the drive machine has a signal transmitting connection to a roadway information device which supplies information relating to a profile of the roadway in the direction of travel of the motor vehicle. The roadway information device can be embodied, for example, as a digital camera, an infrared camera, a transmitter and receiver of radar signals or a system which evaluates information from a digital road map. In order to increase the accuracy, the roadway information device can receive and process signals for determining the position of the motor vehicle, such as for example what are referred to as GPS signals.

The control device is provided for carrying out a changeover from the first maximum value to the second maximum value as a function of the aforesaid information relating to the profile of the roadway. The control device therefore permits the output torque of the drive machine to be increased above the first maximum value as a function of the information relating to the profile of the roadway. The control device can therefore decide in a predictive fashion whether it is more advantageous, for reasons to do with saving fuel, to increase the output torque of the drive machine or to shift down in the transmission. Evaluating the information relating to the profile of the roadway makes the probability of making the correct decision very high.

In addition to the aforesaid two maximum values, the control device can also limit the output torque of the drive machine to further maximum values which deviate from the two maximum values. The changeover from the second maximum value to the first maximum value can likewise be dependent on the aforesaid information relating to the profile of the roadway. The transmission can be embodied as a gearbox which is activated manually by a driver of a vehicle or as an automatic transmission, for example in the form of a gearbox of planetary design or an automated change speed gearbox. If the transmission is embodied as a manual gearbox, the driver of the vehicle can be requested to shift back by means of a display which is actuated by the control device.

In one embodiment of the invention, the transmission is embodied as an automatic transmission which is actuated by the abovementioned control device. The transmission can also be actuated by a further control device which has a signal transmitting connection to the control device of the drive machine.

The driver of the vehicle can set a request for a torque at the output of the transmission by means of a power actuator element, for example in the form of an accelerator pedal. The driver of the vehicle can also set a request for an output torque of the drive machine which also constitutes a predefined value for the torque at the output of the transmission. In addition to the driver of the vehicle, further systems such as, for example, a speed control system, can also influence the request. When a request for a torque at the output of the transmission is increased, the control device tests whether the requested torque can be set in the current gear speed of the transmission with an output torque of the drive machine which is higher than the first maximum value and lower than the second maximum value. During this test, the control device takes into account the transmission ratio of the transmission in the current gear speed. Furthermore, the control device tests whether owing to the information relating to the profile of the roadway it is to be expected that the necessary torque of the drive machine will remain lower than the second maximum value within a section of the roadway ahead of the motor vehicle. This is the case in particular if the positive gradient of the roadway within the section ahead of the motor vehicle rises by less than a definable positive gradient differential limiting value. The section can comprise, for example 200-500 m roadway.

If both tests supply positive results, the control device limits the output torque of the drive machine to the second maximum value and there is therefore a changeover from the first maximum value to the second maximum value. At the same time, the control device sets the output torque of the drive machine in such a way that the torque at the output of the transmission is increased to the requested value and maintains the current gear speed in the transmission.

In one refinement of the invention, the control device is provided for estimating a torque of the drive machine which is necessary to travel over the section of the roadway while maintaining the current gear speed in the transmission and comparing it with the second maximum value. To do this, the control device evaluates the so-called and generally known running resistance equation in which an equilibrium of the forces acting on the vehicle in the longitudinal direction is established. In this calculation, in particular the positive gradient of the roadway within the aforesaid section of the roadway is taken into account. On the basis of this estimation it is possible for the control device to decide whether shifting back is necessary within the aforesaid section despite the changeover to the second maximum value. In this case, the shifting back can be carried out immediately and therefore compared to increasing the torque and subsequent shifting back it is possible to achieve overall lower fuel consumption.

In one embodiment of the invention, the control device is provided for determining a load value of the transmission as a function of the output torque of the drive machine and storing it, and no longer permitting a changeover to the second maximum value when a limiting load value is exceeded. Long and/or frequently acting high torques at the input of the transmission can stress the transmission to such an extent that when very high torques continue to be applied damage to the transmission cannot be ruled out. The aforesaid load value is a measure of the previous load on the transmission. The load characteristic value can be formed, for example, by summing how often and for how long the output torque of the drive machine has exceeded the first maximum value. In particular, a specific load value can be determined for each gear speed of the transmission and said load value characterizes the loads on the specific gear speed.

As a result of the fact that no changeover is permitted to the second maximum value after the limiting load value has been exceeded, damage to the transmission as a result of excessively high torques is prevented. This is important in particular if the changeover is not only carried out in the direct gear speed but rather also in other gear speeds.

In one embodiment of the invention, the control device is provided for limiting the output torque of the drive machine to the second maximum value only for a limited time period. The duration of the time period is dependent in particular on the output torque of the drive machine and/or on a load value of the transmission. The time duration is in particular shorter the higher the output torque of the drive machine and/or the load value. As a result, damage to the transmission by excessively high torques is prevented.

Further advantages of the invention emerge from the description and the drawing. Exemplary embodiments of the invention are illustrated in simplified form in the drawing and explained in more detail in the following description. In the drawing:

FIG. 1 shows a drive train of a motor vehicle in which the control device of a drive machine has a signal transmitting connection to a camera, FIGS. 2a/2b show illustrations of the time profiles of a requested torque at the output of the transmission, an output torque of the drive machine and a gear speed of the transmission, and FIGS. 3a/3b show the profile of a positive gradient of the roadway in the direction of travel of the motor vehicle.

According to FIG. 1, a drive train 10 of a motor vehicle (not illustrated) has a drive machine 14 which is actuated by a control device 16. A driver of a vehicle can set predefined values for an output torque of the drive machine 14 by means of a power actuating element in the form of an accelerator pedal 52.

The drive machine 14 can be connected by means of an output shaft 13 and a friction clutch 12 to an input shaft 11, arranged coaxially with respect to the output shaft 13, of a transmission 19 in the form of an automated, unsynchronized change speed gearbox. The clutch 12 and the change speed gearbox 19 are likewise actuated by the control device 16. The control device 16 has, for this purpose, a signal transmitting connection to actuating elements (not illustrated) and sensors of the clutch 12 and of the transmission 19. As a result, the control device 16 can open or close the clutch 12 and carry out gear speed changes in the transmission 19. The control device 16 is also connected to a gearshift lever 51 by means of which the driver of the vehicle can request gear shifts of the transmission 19. Alternatively, gear shifts can also be triggered from an original gear speed into a target gear speed in a manner known per se by the control device 16. The determination of the target gear speed is dependent here, inter alia, on the velocity of the motor vehicle and on a degree of activation of the accelerator pedal 52 by the driver of the vehicle.

The transmission 19 is embodied as what is referred to as a two group transmission. A front-mounted transmission in the form of a split group 17 is arranged connected in a rotationally fixed fashion to the transmission input shaft 11. The main transmission 18 is assigned downstream of the split group 17.

The transmission input shaft 11 can be operatively connected by means of the split group 17 via two different gearwheel pairs 20, 21 to a countershaft 22 which is arranged parallel to the transmission input shaft 11. The gearwheel pairs 20, 21 have a different transmission ratio. Fixed wheels 23, 24, 25 for the third, second and first gear speed of the main transmission 18 are arranged on the countershaft 22 in a rotationally fixed fashion. The fixed wheels 23, 24, 25 respectively intermesh with associated loose wheels 26, 27, 28 which are arranged in a rotatable fashion on a transmission output shaft 29 which is arranged coaxially with respect to the transmission input shaft 11. The loose wheel 26 can be connected in a rotationally fixed and positively locking fashion to the transmission output shaft 29 by means of a sliding sleeve 30, and the loose wheels 26 and 28 can be connected in a rotationally fixed and positively locking fashion to the transmission output shaft 29 by means of a sliding sleeve 31.

A sliding sleeve 41 of the split group 17 and the sliding sleeves 30, 31, 39 of the main transmission 18 can be activated by means of the actuating elements (not illustrated) of the transmission 19. A positively locking connection can thus be formed or interrupted between associated shift elements and the transmission output shaft 29.

If the transmission input shaft 11 is connected directly to the transmission output shaft 29 without intermediate connection of the countershaft 22, then the direct gear speed is engaged in the transmission 19.

The modified torque and the rotational speed of the drive machine 14 are transmitted from the transmission output shaft 29 by means of a drive shaft 32 to an axle transmission 33 which, in a manner known per se, transmits the rotational speed in identical or different proportions to drive wheels 36, 37 via two output shafts 34, 35.

The control device 16 has a signal transmitting connection to a roadway information device in the form of a digital camera 53 which senses a section of the roadway in the direction of travel of the motor vehicle. The camera 53 determines therefrom information about the profile of the roadway such as, for example, a positive gradient or a negative gradient, bends or a state of the roadway such as, for example, wetness or ice. This information is made available by the camera 53 to the control device 16 which takes into account this information in the actuation of the drive machine 14 and of the transmission 19.

In FIGS. 2a and 2b the reaction of the control device 16 to an increase in a request for a torque at the output of the transmission 19 is illustrated for different profiles of the roadway.

In FIG. 2a, a torque in [Nm] and a current gear speed are plotted on an ordinate 60a, and the time is plotted in [s] on an abscissa 61a. A line 62a represents the requested torque ($M_{GAus}$) at the output of the transmission 19, and a line 63a represents the output torque ($M_{Ami}$) of the drive machine 14. A dotted line 64a represents a first maximum value ($M_{Max1}$) and a dashed line 65a represents a second maximum value ($M_{Max2}$) for the output torque of the drive machine 14. During normal operation of the motor vehicle, the control device 16 limits the output torque of the drive machine 14 to the first maximum value ($M_{Max1}$). Furthermore, a dot-dashed line 66a represents the current gear speed of the transmission 19.

Up to a time t1, $M_{GAus}$ is only of such a magnitude that in the current gear speed of the transmission 19 a $M_{Ami}$ which is lower than $M_{Max1}$ is sufficient. At the time t1, $M_{GAus}$ has risen to such an extent that $M_{Ami}$, $M_{Max1}$ is reached. At this time t1, the control device 16 must decide whether it permits a further increase in $M_{Ami}$ and the requested torque $M_{GAus}$ is thus reached, or whether the transmission 19 is shifted back into a lower gear speed. In the case of shifting back, a lower $M_{Ami}$ is necessary since the transmission ratio in the lower gear speed is higher. The control device 16 makes this decision as a function of information about the positive gradient of the roadway in a section ahead of the motor vehicle.

FIG. 3a illustrates a profile of the positive gradient (line 69a) plotted against the distance from the motor vehicle within the section under consideration at the time t1. For this purpose, a positive gradient in [%] is plotted on an ordinate 67a, and a distance in [m] is plotted on an abscissa 68a. The control device 16 forms a difference between a current positive gradient and the positive gradient of the roadway ahead of the motor vehicle for the entire section. This difference is always smaller than a positive gradient differential limiting value for the profile illustrated in FIG. 3a.

Furthermore, the control device 16 tests whether the requested value of $M_{GAus}$ can be reached with an $M_{Ami}$ lower than $M_{Max2}$. Since in this case both conditions are met, the current gear speed in the transmission is maintained and $M_{Ami}$ is increased beyond $M_{Max1}$.

When $M_{Max1}$ is exceeded, a value which is stored in the control device 16 for a gear speed-dependent load value is updated. This value indicates the time period for which $M_{Ami}$ was higher than $M_{Max1}$ in each gear speed of the transmission.

The load value is not permitted to exceed $M_{Max1}$ for an unlimited time but rather it is aborted after a time period which ends at the time t2. The time period is dependent on the gear speed-specific load value and the $M_{Ami}$ while $M_{Max1}$ is being exceeded. At the time t2, the transmission 19 is therefore shifted back, as a result of which $M_{Ami}$ drops below $M_{Max1}$.

FIG. 2b illustrates the same profile from $M_{GAus}$ as in FIG. 2a. The corresponding variables are designated by corresponding reference numerals, in which case "a" has been replaced by "b". At the time t1, $M_{Ami}$ also reaches $M_{Max1}$.

Since, as illustrated in FIG. 3b, the roadway rises to a pronounced degree in the section under consideration ahead of the motor vehicle and the described difference is therefore greater than the positive gradient differential limiting value, the transmission 19 is shifted back at the time t2. As a result, $M_{Ami}$ thus drops off again and remains lower than $M_{Max1}$. Switching over from $M_{Max1}$ to $M_{Max2}$ therefore does not occur.

The invention claimed is:

1. A drive train of a motor vehicle, comprising:
a drive machine;
a transmission; and
a control device for actuating the drive machine, the control device adapted for limiting an output torque ($M_{Ami}$) of the drive machine to a first maximum value ($M_{Max1}$) or a second, higher maximum value ($M_{Max2}$) in order to protect the transmission,
wherein the control device has a signal transmitting connection to a roadway information device which supplies information relating to a profile of the roadway in the direction of travel of the motor vehicle, and the control device is adapted for carrying out a changeover from the first maximum value ($M_{Max1}$) to the second maximum value ($M_{Max2}$) as a function of said information relating to the profile of the roadway,
and wherein the transmission is embodied as an automatic transmission and is actuated by the control device, such that when a request for an increased torque ($M_{GAus}$) at the output of the transmission is made, the control device performs:
the requested increased torque test, which tests whether the requested torque ($M_{GAus}$) can be set in a current gear speed of the transmission with the output torque ($M_{Ami}$) of the drive machine which is higher than the first maximum value ($M_{Max1}$) and lower than the second maximum value ($M_{Max2}$), and
a roadway profile test, which tests whether owing to the information relating to the profile of the roadway it is to be expected that a necessary torque of the drive machine will remain lower than the second maximum value ($M_{Max2}$) within a section of the roadway ahead of the motor vehicle, and
in the case of the result of both tests being positive:
the output torque ($M_{Ami}$) of the drive machine is limited to the second maximum value ($M_{Max2}$),
the output torque ($M_{Ami}$) of the drive machine is set so that the torque ($M_{GAus}$) at the output of the transmission is increased to the requested increased torque, and
the current gear speed of the transmission is maintained.

2. The drive train as claimed in claim 1, wherein the control device is adapted to anticipate that the second torque ($M_{Ami}$) of the drive machine remains lower than the second maximum value ($M_{Max2}$) if a positive gradient of the roadway within the section ahead of the motor vehicle rises by less than a definable positive gradient differential limiting value compared to a current positive gradient.

3. The drive train as claimed in claim 1, wherein the control device is adapted to estimate a torque ($M_{Ami}$) of the drive machine which is necessary to travel over the section of the roadway while maintaining the current gear speed in the transmission and comparing it with the second maximum value ($M_{Max2}$).

4. The drive train as claimed in claim 1, wherein the control device is adapted to determine a load value of the transmission as a function of the output torque ($M_{Ami}$) of the drive machine and store said load value, and no longer permits a changeover to the second maximum value ($M_{Max2}$) when a limiting load value is exceeded.

5. The drive train as claimed in claim 4, wherein the control device is adapted to determine a plurality of gear speed-dependent load values and store said values and no longer permits a changeover to the second maximum value ($M_{Max2}$) when an associated limiting load value is exceeded by one of the gear speed-dependent load values, if a gear speed in the transmission which is assigned to said one of the gear speed-dependent load values is engaged.

6. The drive train as claimed in claim 1, wherein the control device is adapted to limit the output torque ($M_{Ami}$) of the drive machine to the second maximum value ($M_{Max2}$) only for a limited time period.

7. The drive train as claimed in claim 6, wherein the control device is adapted to determine said limited time period as a function of the output torque ($M_{Ami}$) of the drive machine.

8. The drive train as claimed in claim 6, wherein the control device is adapted to determine said limited time period as a function of a load value of the transmission.

* * * * *